United States Patent
Miyata

(10) Patent No.: US 6,533,080 B2
(45) Date of Patent: Mar. 18, 2003

(54) FLOATING CALIPER TYPE DISC BRAKE

(75) Inventor: Katsuhiro Miyata, Tokyo (JP)

(73) Assignee: Akebono Brake Industry Co., Ltd., Tokyo (JP)

(*) Notice: Subject to any disclaimer, the term of this patent is extended or adjusted under 35 U.S.C. 154(b) by 0 days.

(21) Appl. No.: 09/839,155

(22) Filed: Apr. 23, 2001

(65) Prior Publication Data

US 2002/0029942 A1 Mar. 14, 2002

(30) Foreign Application Priority Data

Apr. 27, 2000 (JP) ........................................ 2000-127265

(51) Int. Cl.⁷ .............................................. F16D 65/38
(52) U.S. Cl. .................................. 188/73.37; 188/73.43
(58) Field of Search ........................... 188/73.31, 73.35, 188/73.36, 73.37, 73.38, 73.39, 213, 208, 217, 248, 250 E, 70 R, 73.1, 71.1, 73.43, 73.2

(56) References Cited

U.S. PATENT DOCUMENTS

| | | | | |
|---|---|---|---|---|
| 3,893,547 A | * | 7/1975 | Schanz | 188/205 A |
| 4,512,446 A | * | 4/1985 | Chuwman et al. | 188/264 G |
| 4,940,119 A | * | 7/1990 | Kondo et al. | 188/264 G |
| 5,025,897 A | * | 6/1991 | Hirashita et al. | 188/250 B |
| 5,083,641 A | * | 1/1992 | Kleiva | 188/250 B |
| 5,323,882 A | * | 6/1994 | Waterman et al. | 188/73.1 |
| 5,467,846 A | * | 11/1995 | Abe et al. | 188/73.37 |
| 5,535,856 A | * | 7/1996 | McCormick et al. | 188/205 A |
| 5,551,537 A | * | 9/1996 | Mery et al. | 188/73.1 |
| 5,588,508 A | * | 12/1996 | Le Deit | 188/73.1 |
| 5,860,496 A | * | 1/1999 | Kullman et al. | 188/73.37 |
| 5,941,348 A | * | 8/1999 | Matsumoto et al. | 188/73.36 |
| 6,003,642 A | * | 12/1999 | Mori et al. | 188/73.37 |
| 6,182,801 B1 | * | 2/2001 | Yoshida et al. | 188/73.1 |
| 6,186,288 B1 | * | 2/2001 | Baba et al. | 188/73.36 |
| 6,206,147 B1 | * | 3/2001 | Yoshida et al. | 188/73.36 |
| 6,286,636 B1 | * | 9/2001 | Iwata | 188/73.31 |
| 6,296,085 B1 | * | 10/2001 | Yukoku | 188/73.36 |
| 6,345,701 B1 | * | 2/2002 | Di Ponio | 188/250 B |

FOREIGN PATENT DOCUMENTS

JP       2779027 B2       5/1998

* cited by examiner

*Primary Examiner*—Jack Lavinder
*Assistant Examiner*—Benjamin A Pezzlo
(74) *Attorney, Agent, or Firm*—Morgan, Lewis & Bockius LLP

(57) ABSTRACT

A pair of engaging protrusions provided in a support member and a pair of engaging grooves provided in a back plate of a pad are engaged with each other, and the pad is capable of being displaced only in the axial direction of a rotor. Each engaging protrusion is composed of a rising section and a bent section which is bent at the tip end of the rising section at a right angle. The rising section composes a brake torque bearing section, and the bent section composes a rotation preventing section of the pad. The pad is prevented from rattling with respect to the support member by first and second pad clips.

7 Claims, 9 Drawing Sheets

FLOATING CALIPER TYPE DISC BRAKE

BACKGROUND OF THE INVENTION

1. Field of the Invention

A floating caliper type disc brake of the present invention is used for braking an automobile. The present invention provides a disc brake of this type capable of obtaining an excellent brake force over a long period of time and preventing the occurrence of noise by preventing uneven wear of pads incorporated into the disc brake.

2. Description of the Related Art

For example, as disclosed in Japanese Patent No. 2779027, there is provided a conventional disc brake for braking an automobile, which is called a floating caliper type disc brake, in which the caliper is displaced with respect to the rotor during braking. This floating caliper type disc brake is composed in such a manner that the support member arranged adjacent to the rotor, which is rotatable together with the wheel, is fixed to a vehicle body, and the caliper is movably held by the support member so that the caliper can be freely displaced in the axial direction of the rotor. Both end sections of a pair of pads are slidably engaged at positions separate from each other in the circumferential direction of the rotor in a portion of the support member so that both end sections of the pair of pads can be freely slid in the axial direction of the rotor. The caliper having a cylinder and pawls arranged across the pads, and the cylinder houses a piston for pushing the pad against the rotor.

In the case of braking, pressure fluid is supplied into the cylinder, and the pad on the inner side is pushed against the inner face of the rotor. Then, the caliper is displaced by the reaction of this pushing force. Therefore, the pawls push the pad against the outer face of the rotor. As a result, the rotor is strongly held by both sides of the inner and the outer face, so that braking can be conducted.

In the conventional floating caliper type disc brake, which is disclosed in Japanese Patent No. 2779027, the pad is minutely displaced together with the caliper in a direction except for the axial direction of the rotor which is the original direction of displacement. As a result, the pad tends to behave unstably. When the pad behaves unstably as described above, the lining composing the pad wears unevenly with respect to the direction of the face. That is, what is called uneven wear is caused, and further the pad is vibrated in the braking operation, and noise offensive to the ear tends to be caused.

SUMMARY OF THE INVENTION

The present invention has been accomplished in view of the above circumstances. It is an object of the present invention to prevent the occurrence of uneven wear of the lining composing the pad by stabilizing the behavior of the pad during braking, and also it is an object of the present invention to prevent the occurrence of noise during braking.

In the same manner as that of the conventional floating caliper type disc brake, the floating caliper type disc brake of a first aspect of the present invention includes: a support member, run-in side and run-out side support engaging sections, a pair of pads, a caliper and a piston.

The support member is held by a vehicle body being located adjacent to a rotor rotating together with a wheel.

The run-in side and run-out side support engaging sections are respectively provided in a run-in side and run-out side end sections of the support member. Each of the pads is arranged on one face of a back plate opposing to the side of the rotor and provided with a lining. Run-in side and run-out side pad engaging sections, which are arranged at both end sections of the back plate, are engaged with the run-in side and run-out side support engaging section so that the run-in side and run-out side pad engaging sections can be freely slid in the axial direction of the rotor. Under the above condition, the run-in side and run-out side pad engaging sections are arranged opposing to both sides of the rotor.

The caliper is held by the support member being freely displaced in the axial direction of the rotor.

The piston is housed in the caliper and freely pushed out toward the rotor according to supply of pressure fluid into the caliper.

Braking is conducted when the pair of pads are pressed against both sides of the rotor by the caliper according to the pushing motion of the piston.

A relation between the distance of the run-in side and run-out side support engaging sections and the distance of the run-in side pad engaging section and the run-out side pad engaging sections is restricted. When the relation between both the distances is restricted, at least one of the pair of pads is beared by the support member only with one of the support engaging sections of the run-in side and the run-out side support engaging sections when the brake torque according to a frictional force caused between the side of the rotor and the lining of the pad is not higher than a predetermined value. At least one of the pair of pads is beared by the support member with both the run-in side and the run-out side support engaging sections when the brake torque according to a frictional force caused between the side of the rotor and the lining of the pad exceeds the predetermined value.

Especially, in the floating caliper type disc brake of the present invention, the run-in side and run-out side support engaging sections are respectively formed into a substantially L-shaped engaging protrusion composed of a rising section arranged in the radial direction of the rotor and a bent section bent at a tip end of the rising section in the circumferential direction of the rotor, and the run-in side and run-out side pad engaging sections are respectively formed into a substantially L-shaped engaging groove corresponding to the L-shaped engaging protrusion. In the engaging condition of each engaging protrusion with each engaging groove, the rising section composes a brake torque bearing section for preventing the pad from being displaced in the circumferential direction of the rotor together with the rotor when brake torque is generated, and the bent section composes a rotation preventing section for preventing the pad from being rotated by a couple of forces.

According to the floating caliper type disc brake of the present invention composed as described above, it is possible to stabilize the behavior of the pad during braking. Therefore, the occurrence of uneven wear of the lining composing the pad can be prevented, and further the occurrence of noise can be prevented when the brake is applied.

DETAILED DESCRIPTION OF THE PREFERRED EMBODIMENTS

Figure 1:
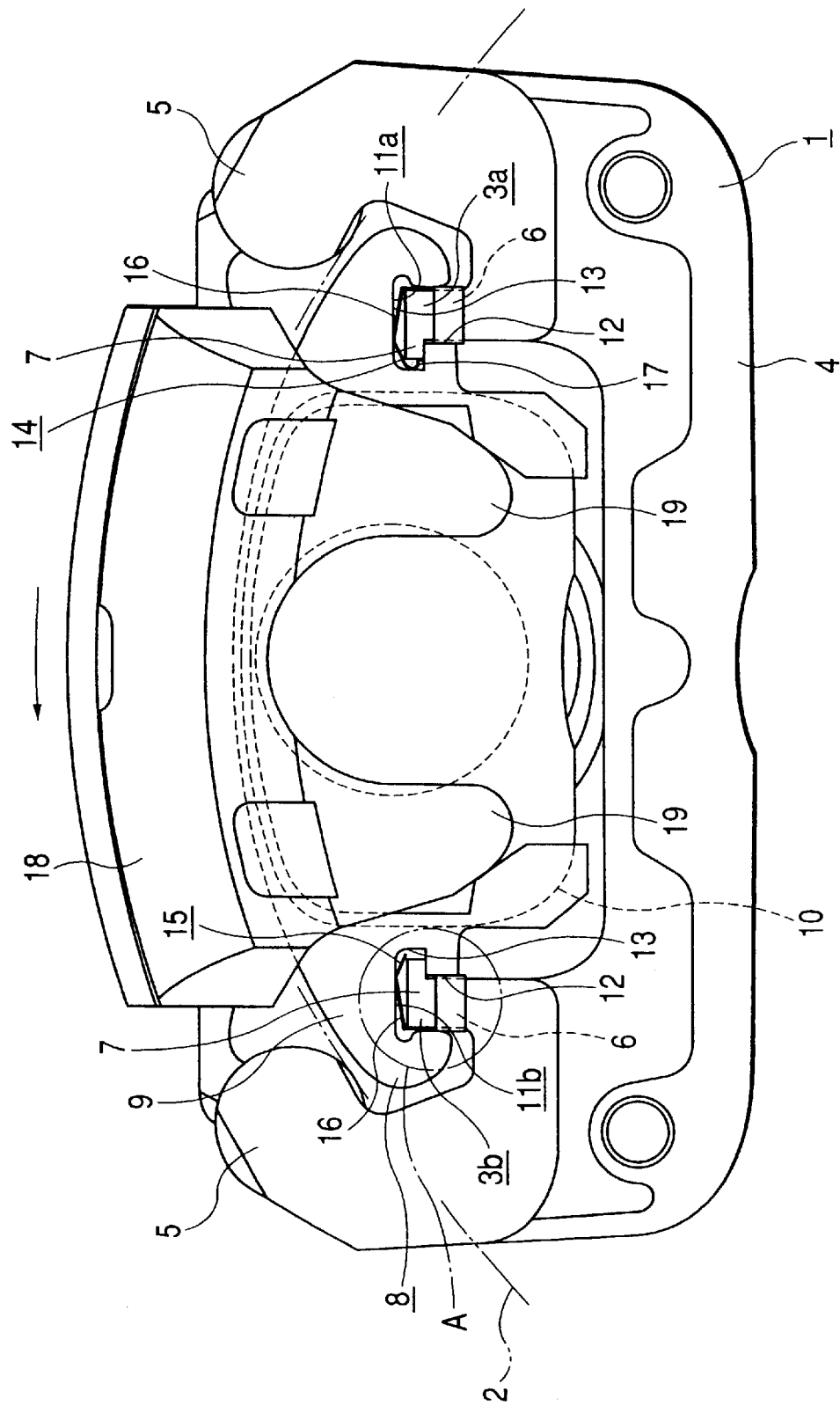
FIG. 1 is a front view showing a first embodiment of the present invention.
Figure 2:
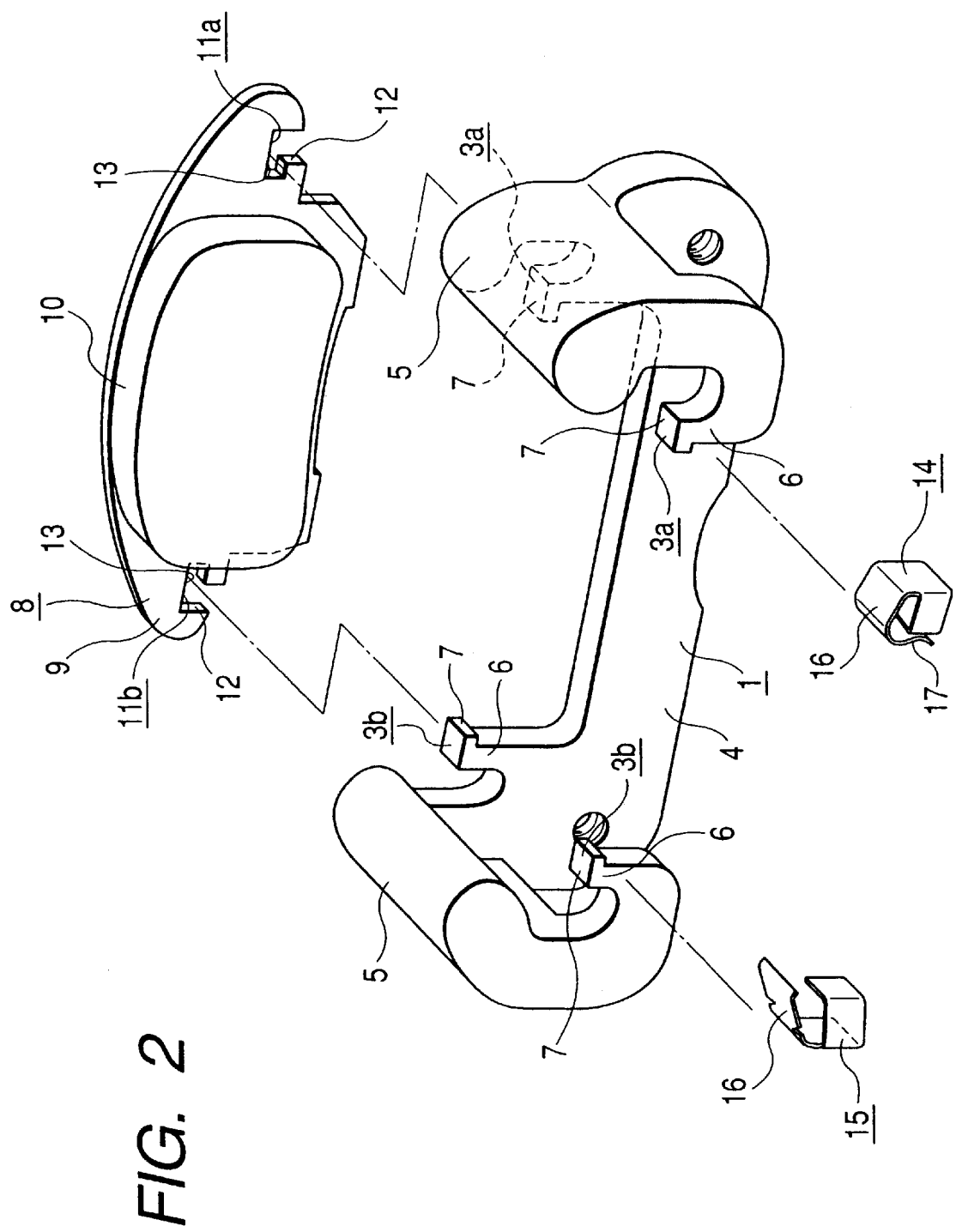
FIG. 2 is an exploded perspective view showing a primary portion.
Figure 3:
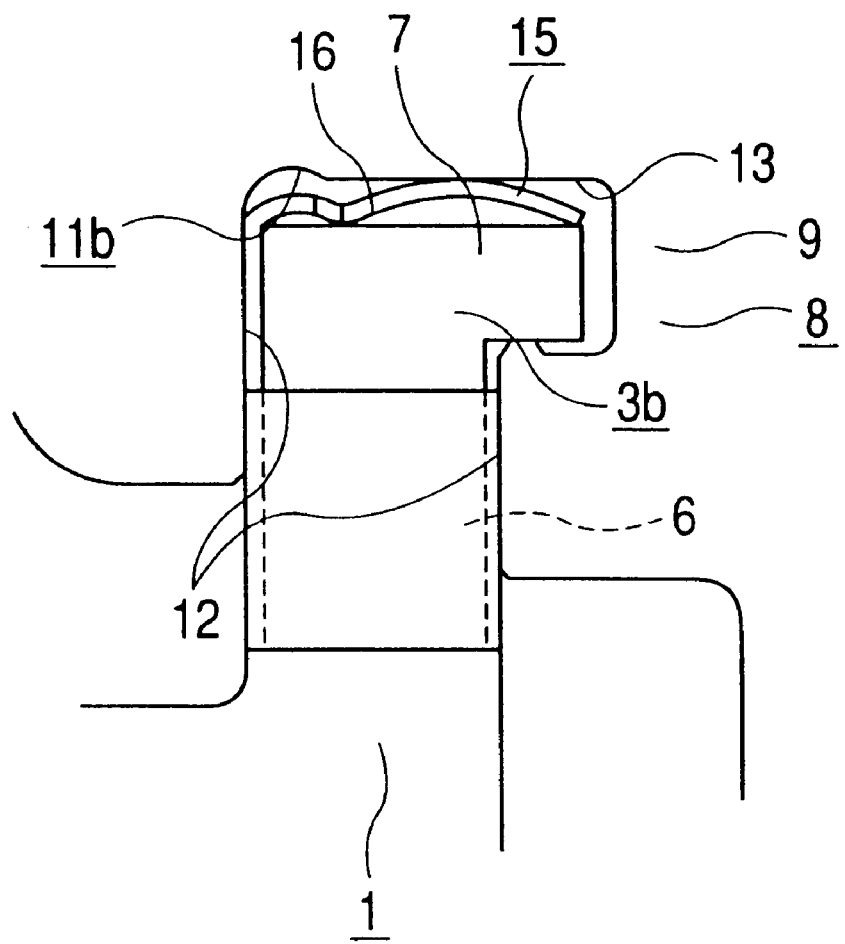
FIG. 3 is an enlarged view showing portion A in FIG. 1.

FIGS. 1 to 4 are views showing the first embodiment of the present invention. The support member 1 is heldby a vehicle body via a suspension being adjacent to the inside (the central side of the rotor in the width direction when the disc brake device is incorporated into an automobile) of the rotor 2 which is rotated together with a wheel not shown in the drawing. In a portion of the support member 1, that is, at both end sections of the support member 1 in the rotational direction of the rotor 2, there are respectively provided an engaging section of the support member in a run-in side and an engaging section of the support member in a run-out side, which are respectively L-shaped engaging protrusion 3a and 3b. That is, at both end sections of the attaching section 4 to be held by the suspension, the support member 1 has an engaging protrusion 3a which is a run-in side support engaging section on the inner side and an engaging protrusion 3b which is a run-out side support engaging section on the inner side. At forward end sections of the connecting sections 5, 5 which are bent at both end sections of the attaching section 4 onto the side of the rotor 2, there are respectively provided an engaging protrusion 3a which is a run-in side support engaging section on the outer side and an engaging protrusion 3b which is a run-out side support engaging section on the outer side. These engaging protrusions 3a, 3b on the outer side are aligned with the engaging protrusions 3a, 3b on the inner side with respect to the axial direction of the rotor 2.

In the embodiment shown in the drawings, the engaging protrusions 3a, 3b are respectively formed into an L-shape. The engaging protrusions 3a, 3b respectively have a rising section 6 and a bent section 7 which is bent at the forward end (upper end in FIGS. 1 to 4) of the rising section 6 at a right angle in a direction so that the engaging protrusions 3a, 3b can approach each other with respect to the rotational direction of the rotor 2. In this case, the rising section 6 composes the brake torque bearing section described in the first aspect of the invention, which exists in the substantially radial direction (the vertical direction of FIGS. 1 to 4) of the rotor 2. The bent section 7 composes the rotation preventing section described in the first aspect of the invention, which exists in the substantially circumferential direction (the traverse direction of FIGS. 1 to 4) of the rotor 2.

The above support member 1 movably holds a pair of pads 8 in such a manner that the pair of pads 8 can be freely moved in the axial direction of the rotor 2 while the rotor 2 is being interposed between the pair of pads 8. Each pad 8 includes a lining 10, which is arranged on one face of the back plate 9, opposed to the side of the rotor 2. Concerning the rotational direction of the rotor 2, at both end sections of the back plate 9, there are provided engaging grooves 11a, 11b which are respectively a run-in side pad engaging section and a run-out side pad engaging section described in the first aspect of the invention. Each engaging groove 11a, 11b is formed into an L-shape so that it can conform with the profile of each engaging protrusion 3a, 3b formed in the support member 1. The engaging grooves 11a, 11b respectively have an entrance opening section 12 and an inner part 13 which is bent at a right angle at the inner end portion (the upper end on FIGS. 1 to 4) of the entrance opening section 12 so that the inner parts 13 can approach each other with respect to the rotational direction of the rotor 2.

In this case, the entrance opening section 12 composes the brake torque bearing section described in the first aspect of the invention, which exists in the substantially radial direction (the vertical direction of FIGS. 1 to 4) of the rotor 2. The inner part 13 composes the rotation preventing section described in the first aspect of the invention, which exists in the substantial circumferential direction (the traverse direction in FIGS. 1 to 4) of the rotor 2.

Each engaging groove 11a, 11b is engaged with each engaging protrusion 3a, 3b, and each pad 8 can be held by the support member 1 so that the pad 8 can be freely displaced in the axial direction of the rotor 2. Under the above condition, the rising section 6 of each engaging protrusion 3a, 3b is engaged with the opening section 12 of each engaging groove 11a, 11b, and the bent section 7 is engaged with the inner part 13. Under the above condition, the engaging section of the rising section 6 with the entrance opening section 12 composes the brake torque bearing section, and the engaging section of the bent section 7 with the inner part 13 composes the rotation preventing section.

Between the engaging protrusions 3a, 3b and the engaging grooves 11a, 11b which are engaged with each other in this way, a first padclip 14 and a second pad clip 15 are arranged. These pad clips 14, 15 respectively have both the following functions (1) and (2) or one of the following functions (1) and (2).

(1) Both end sections of each back plate 9 in which the engaging grooves 11a, 11b are formed are pushed to the outside in the radial direction of the rotor 2, (that is, both end sections of each back plate 9 in which the engaging grooves 11a, 11b are formed are pushed to the direction perpendicular to the virtual straight line connecting the engaging groove 11a with the engaging groove 11b, that is, to the upward in FIG. 1).

(2) Both end sections of the back plate 9 are pushed in the rotary direction of the rotor 2 (to the left in FIG. 1) when the vehicle is running forward).

Each pad clip 14, 15 having the above functions is formed in such a manner that an elastic metal sheet such as a stainless steel spring sheet having an anticorrosion property is bent so that the rising section 6 of each engaging protrusion 3a, 3b can be surrounded by the metal sheet, and each pad clip 14, 15 is attached to each engaging protrusion 3a, 3b. In a forward end portion of the each pad clip 14, 15 (a portion close to the upper end of each pad clip 14, 15), that is, on a face of the pad clip opposed to the inner face of the inner part 13 of each engaging groove 11a, 11b opposed to the outside portion of the rotor 2 in the radial direction, there is provided an elastic pushing section 16 of the outer diameter side for exhibiting the above function (1). At a forward end of the first pad clip 14 provided on the run-in side and in a portion (a left portion of FIG. 1) close to the center of the pad 8, there is provided a circumferential side elastic pushing section 17 for exhibiting the function (2).

In the above elastic pushing section 16 on the outer diameter side and the elastic pushing section 17 on the circumferential side, the elastic pushing section 16 on the outer diameter side for exhibiting the function (1) is arranged between the outer diameter side face (the upper face shown in FIGS. 1 to 4) of each protrusion 3a, 3b and the inner side face on the outer diameter side of each engaging groove 11a, 11b, and pushes both end sections of the back plate 9 to the outside of the rotor 2 in the radial direction. The elastic pushing section 17 on the circumferential side for exhibiting the function (2) is arranged between the front face (the left face in FIG. 1) of the engaging protrusion 3a on the rotary entry side and the front inner side face of the engaging groove 11a, and pushes the back plate 9 in the rotary direction (to the left in FIG. 1) of the rotor 2. When the above first pad clip 14 and the second pad clip 15 are attached, it is possible to prevent is each pad 8 from rattling with respect to each engaging protrusion 3a, 3b.

The support member 1 holds the caliper 18 in such a manner that the caliper 18 can be freely displaced in the axial direction of the rotor 2. In this connection, the structure of holding the caliper 18 by the support member 1 has been conventionally known and is not included as the important point of the present invention. Therefore, the structure of holding the caliper 18 by the support member 1 is not shown in the drawings, and the explanation of the structure is omitted here. In any case, in the cylinder provided in the inner half section (the half section on the reverse side of FIG. 1) of the calipers 18 held by the support member 1, there is provided a piston. According to the supply of pressure fluid into this cylinder, the pad on the inner side (the reverse side of FIG. 1) can be freely pushed out into the inner face (the reverse face of FIG. 1) of the rotor 2 by this piston. At the outer end section (the end section on the viewer's side of FIG. 1) of the caliper 18, there is provided pawls 19, so that the pad 8 on the outer side (the viewer's side of FIG. 1) can be freely pushed against the outside (the viewer's side face of FIG. 1) of the rotor 2. Due to the above structure, when the piston is pushed out, the pair of pads 8 can be pushed against both sides of the rotor 2 by the caliper 18. In this way, braking can be conducted.

A relation between the distance of the engaging protrusions 3a, 3b, which are respectively a support engaging section on the run-in side and a support engaging section on the run-out side, and the distance of the engaging grooves 11a, 11b, which are respectively a pad engaging section on the run-in side and a pad engaging section on the run-out side, is restricted. Only one engaging protrusion 3a (or 3b) of the engaging protrusions 3a, 3b arranged on the run-in side and the run-out side bears the brake torque in the case where the brake torque according to a frictional force caused between the side of the rotor 2 and the lining 10 of each pad 8 is not higher than a predetermined value. In the case where the brake torque according to a frictional force caused between the side of the rotor and the lining of the pad exceeds the predetermined value, this brake torque is beared by both the engaging protrusions 3a, 3b.

Figure 4:
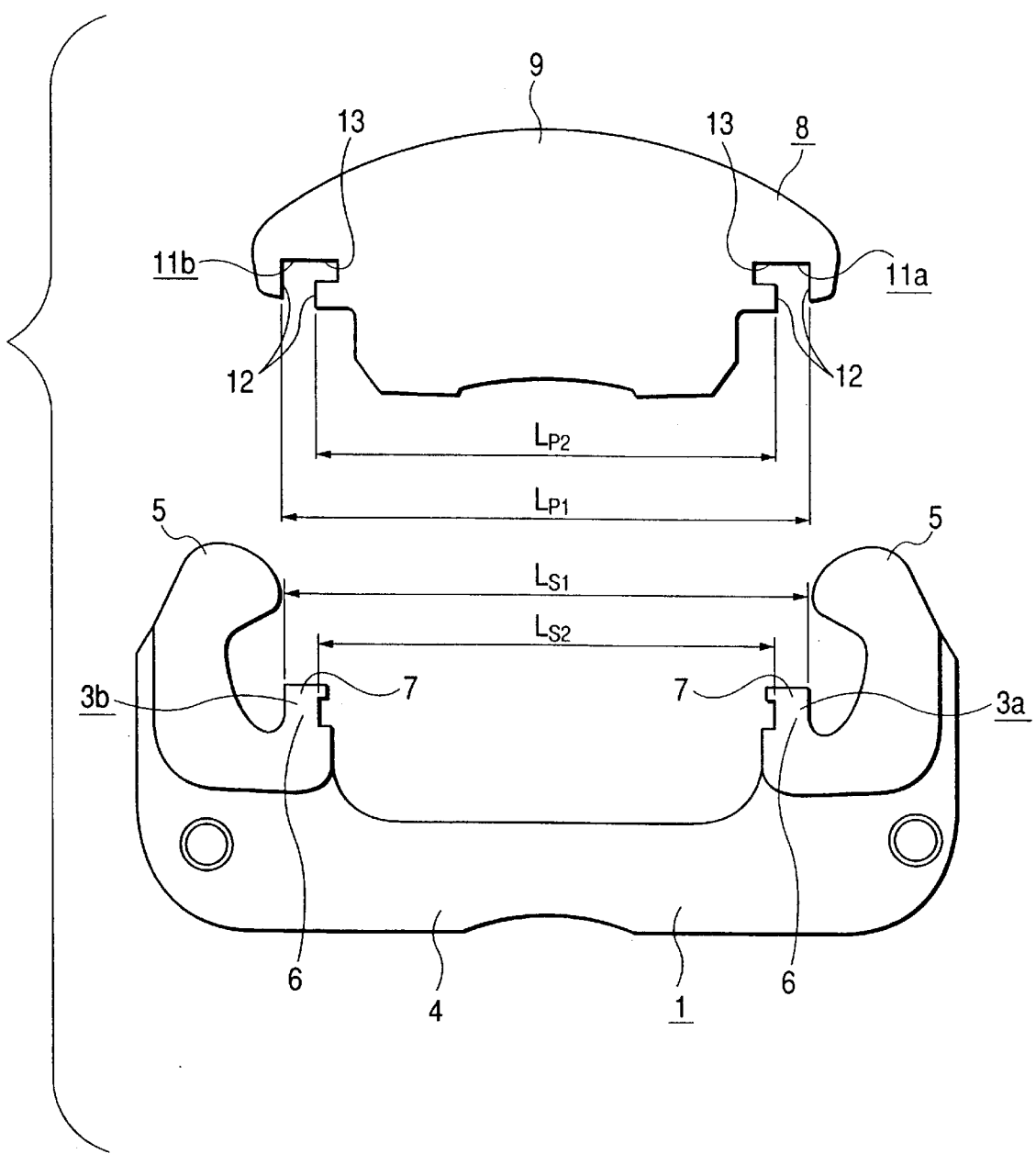
FIG. 4 is a front view showing a state before assembling, wherein only a support member and pad are picked up and shown in this view.

Referring to FIG. 4, these circumstances will be explained in more detail. As shown in FIG. 4, the relation between distances $L_{p1}$ and $L_{p2}$, and the relation between distances $L_{s1}$ and $L_{s2}$ are restricted so that the above function can be accomplished, wherein $L_{p1}$ is a distance between the distant end edges of the entry opening sections 12 of the pair of engaging grooves 11a, 11b provided at both end sections of each pad, and $L_{p2}$ is a distance between the near end edges of the entry opening sections 12 of the pair of engaging grooves 11a, 11b provided at both end sections of each pad, $L_{s1}$ is a distance between the distant end edges of the pair of engaging protrusions 3a, 3b, and $L_{s2}$ is a distance between the near end edges of the rising sections 6. That is, the relation is set to be "$(L_{p1}-L_{s1}) \neq (L_{s2}-L_{p2})$", and the time at which the engaging protrusion 3a and the engaging groove 11a on the rotary entry side start to engage with each other and the time at which the engaging protrusion 3b and the engaging groove lib on the run-out side start to engage with each other are shifted.

That is, in case of braking, each pad 8 tends to be displaced in the rotary direction of the rotor 2 by the brake torque caused by a frictional engagement between the lining 10 of each pad 8 and the side face of the rotor 2. On the other hand, when the engaging protrusion 3a and the engaging groove 11a are engaged with each other and also the engaging protrusion 3b and the engaging groove 11b on the run-out side are engaged with each other, the brake torque is beared by the support member 1.

In the case where the relation among $Lp_1, Lp_2, L_{s1}$ and $L_{s2}$ is set to be "$(L_{p1}-L_{s1})<(L_{s2}-L_{p2})$", the engaging protrusion 3a on the run-in side composing a drawing anchor section and the distant end edge of the opening section of the engaging groove 11a are engaged with each other first, and then the near end edge of the engaging protrusion 3b on the run-out side composing a pushing anchor section and the near end edge of the opening section of the engaging groove 11b are engaged with each other later. In this case, in the case of light braking operation in which the brake torque is not higher than a predetermined value, when each pad 8 is drawn by the rotor 2 and displaced forward in the rotary direction of the rotor 2 by a relatively low force, the distant end edge (the right end edge in FIG. 1) of the engaging protrusion 3a on the run-in side (on the right of FIG. 1) and the distant end edge of the opening section of the engaging groove 11a first come into contact with each other. The engaging protrusion 3a and the engaging groove 11a on the run-in side function as a drawing anchor section. On the other hand, when the brake torque exhibits a braking force exceeding a predetermined value and each pad 8 is drawn by the rotor 2 and displaced forward in the rotary direction of the rotor 2 by the high force, the engaging protrusion 3a on the run-in side which functions as a drawing anchor section is elastically deformed forward in the rotary direction of the rotor 2. Then, each pad 8 is displaced forward in the rotary direction by an amount of this elastic deformation, and the near end edge (the right end edge in FIG. 1) of the engaging protrusion 3b on the run-out side (on the left of FIG. 1) and the near end edge of the opening section of the engaging groove 11b come into contact with each other. The engaging protrusion 3b on the run-out side and the engaging groove 11b function as a pushing anchor section. On the other hand, in the case where the relation among $Lp_1, L_{p2}, L_{s1}$ and $L_{s2}$ is set to be "$(L_{p1}-L_{s1})>(L_{s2}-L_{p2})$", the near end edge of the engaging protrusion 3b on the run-out side composing the pushing anchor section and the near end edge of the opening section of the engaging groove 11b are engaged with each other first, and then the distant end edge is of the engaging protrusion 3a on the run-out side composing the drawing anchor section and the distant end edge of the opening section of the engaging groove 11a are engaged with each other later.

In any case, each pad 8 is only guided by the support member 1 in the case where braking is conducted. Therefore, each guide 8 is not affected by the motion of the caliper. In the case where braking is not conducted, each pad 8 is elastically pressed against the support member 1 by the first pad clip 14 and the second pad clip 15. Therefore, each pad 8 is not rattled with respect to this support member 1. For the above reasons, the motion of each pad 8 can be stabilized. Accordingly, uneven wear of the lining 10 composing each pad 8 can be prevented, and further the occurrence of noise can be prevented in both cases in which braking is conducted and braking is not conducted.

Figure 5:
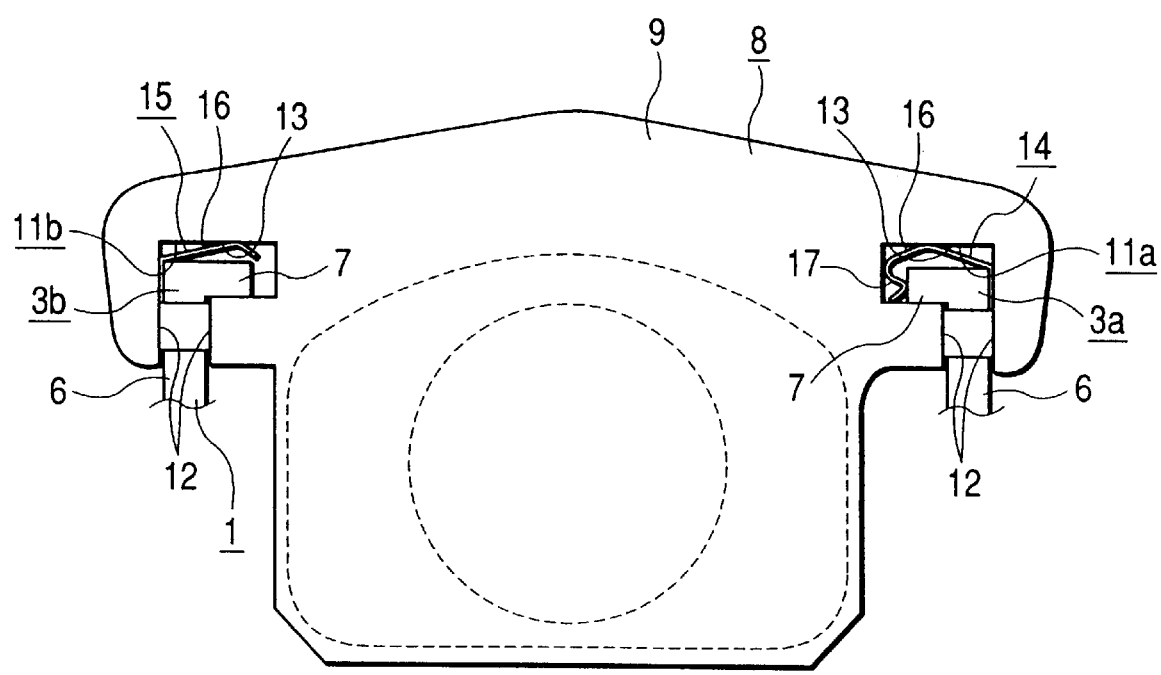
FIG. 5 is a substantial front view showing a second embodiment of the present invention in which an engaging section of the support member with the pad is illustrated.

Next, FIG. 5 is a view showing the second embodiment of the present invention. In the case of the first embodiment described before, the engaging protrusions 3a, 3b on the side of the support member 1 and the engaging grooves 11a, 11b on the side of the pad 8 are located at positions a little inside the center (the substantially central position of the lining) on which brake torque is acting. On the other hand, in this embodiment, the engaging protrusions 3a, 3b and the engaging grooves 11a, 11b are located at positions greatly outside the center described above. Other points of the structure and is action are the same as those of the first embodiment described before.

Figure 6:
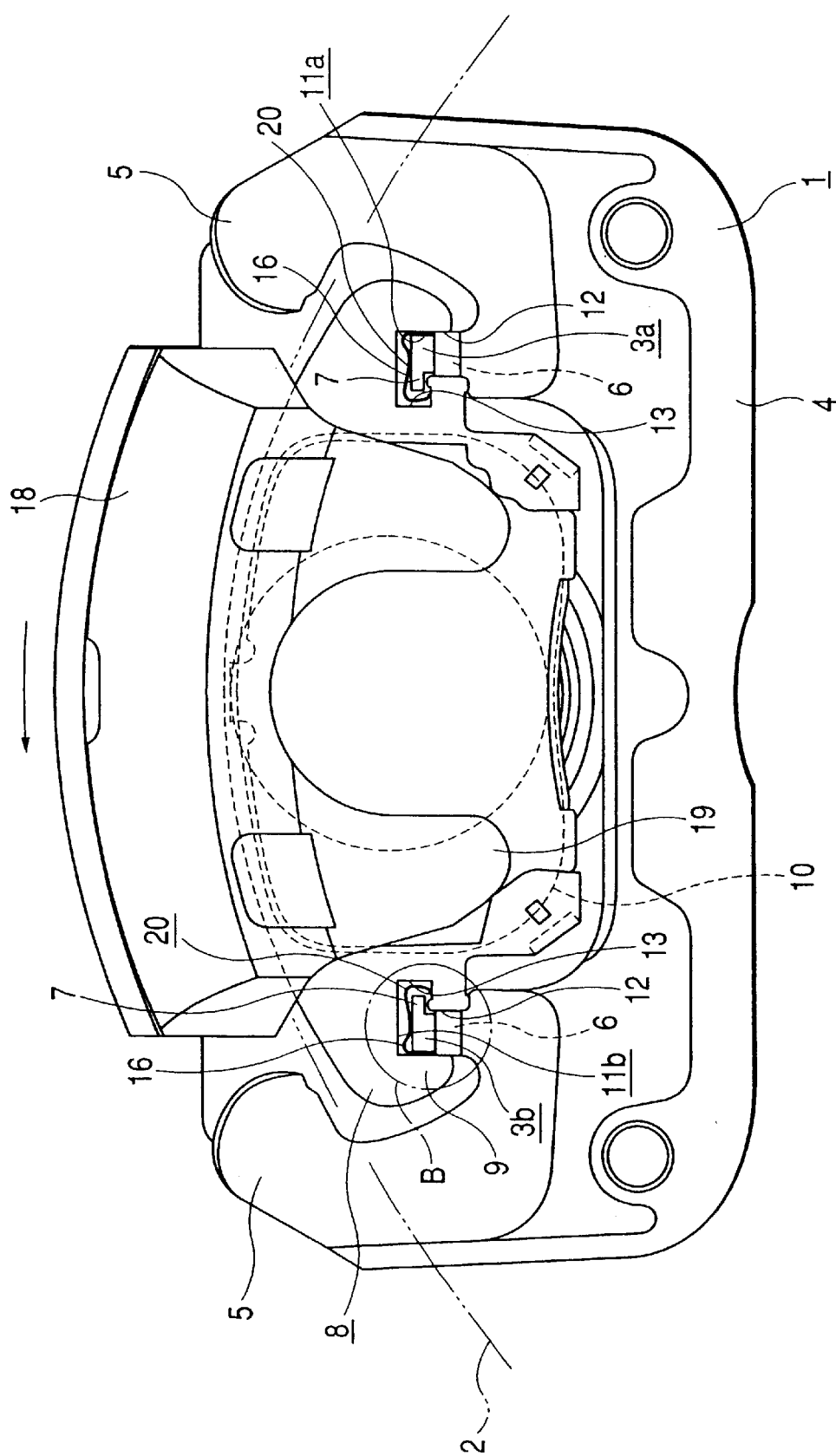
FIG. 6 is a front view showing a third embodiment of the present invention.
Figure 7:
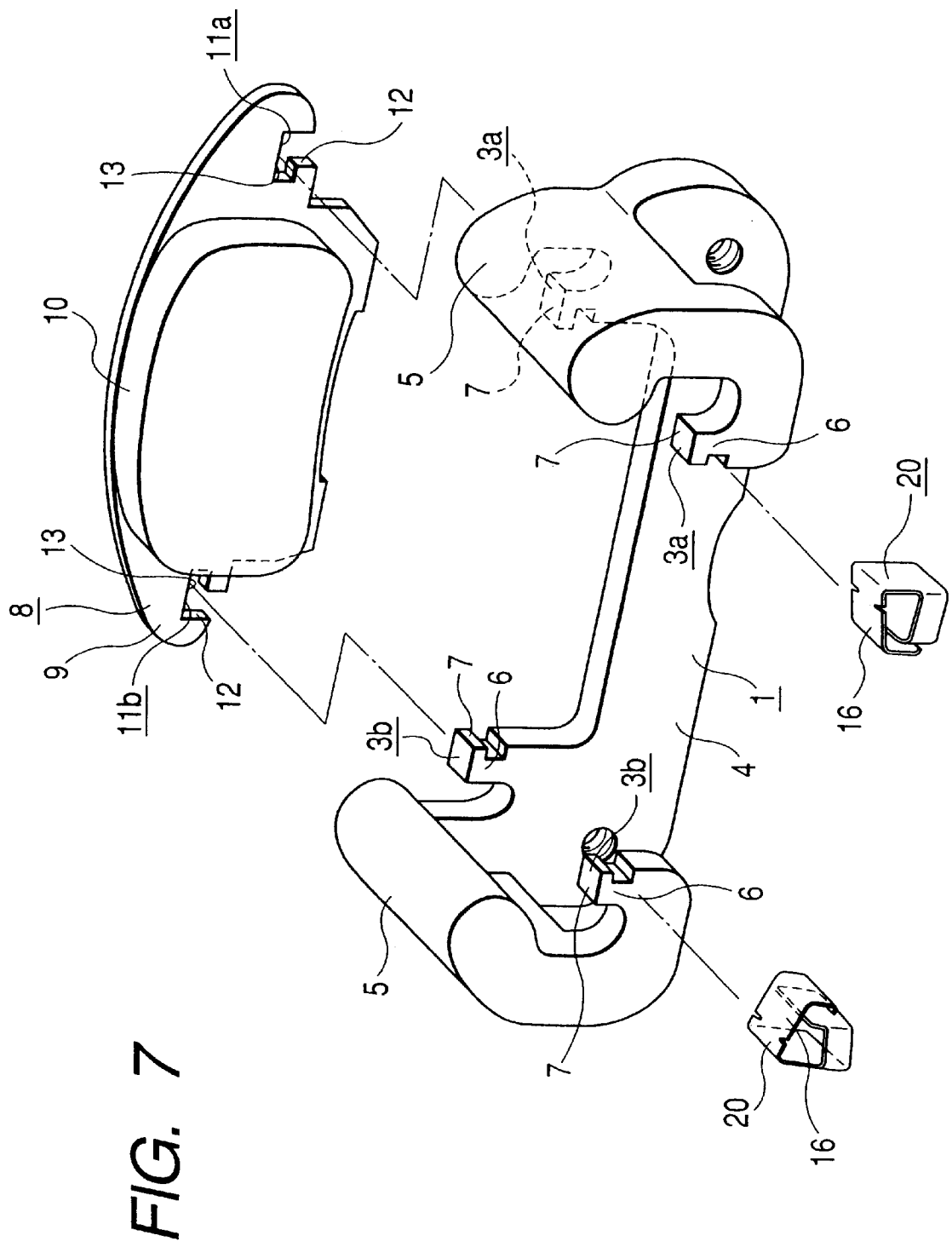
FIG. 7 is an exploded perspective view of a primary portion.
Figure 8:
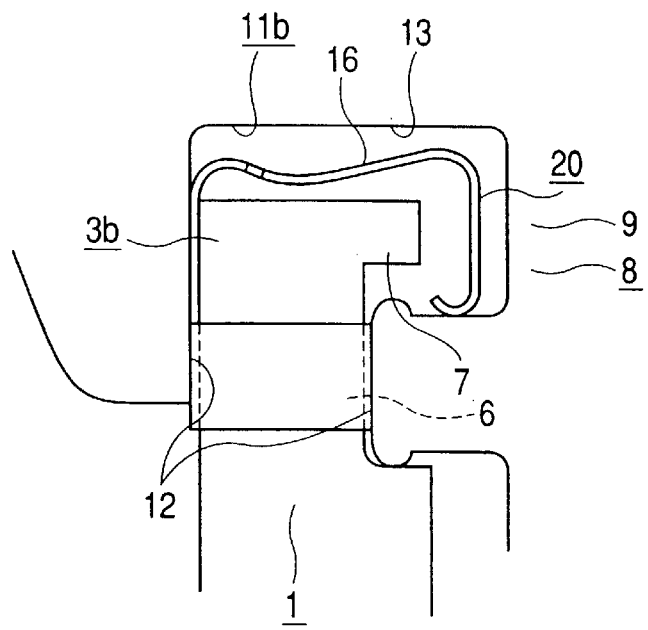
FIG. 8 is an enlarged view of portion B of FIG. 6.

FIGS. 6 to 8 are views showing the third embodiment of the present invention. In the first embodiment described before, the pad 8 is pushed not only outside in the radial direction of the rotor 2 but also in the circumferential direction of the rotor 2. On the other hand, in this embodiment, the pad 8 is pushed only in the radial direction when the pad clips 20, 20, the profiles of which are symmetrical to each other, are used on both the run-in side and run-out side. Other points of the structure and action are the same as those of the first embodiment described before.

Figure 9:
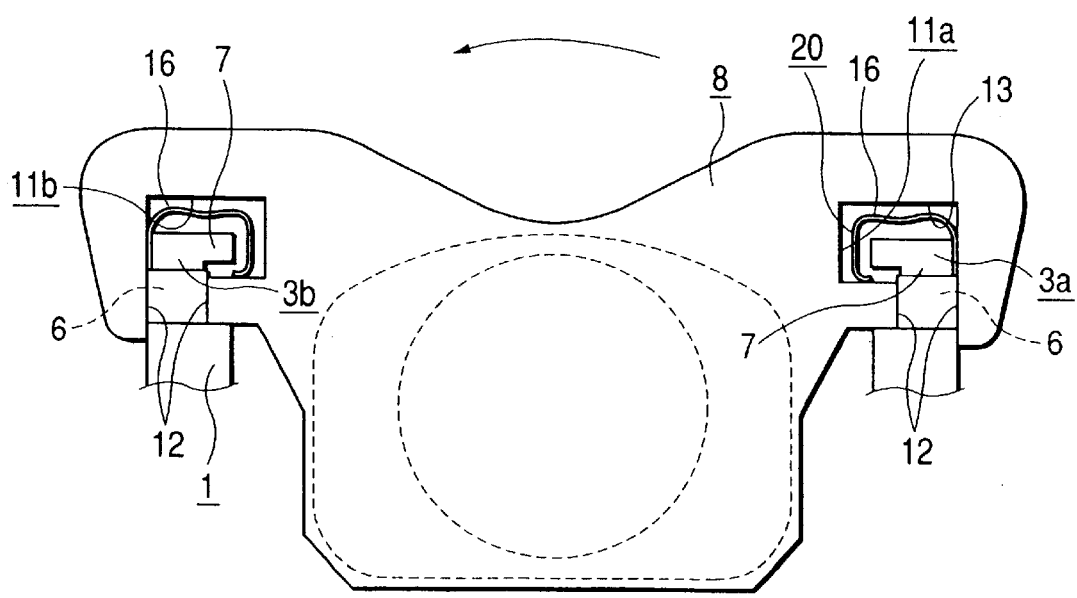
FIG. 9 is a substantial front view showing a fourth embodiment of the present invention in which an engaging section of the support member with the pad is illustrated.

Next, FIG. 9 is a view showing the fourth embodiment of the present invention. In the case of the third embodiment described before, the engaging protrusions 3a, 3b on the side of the support member 1 and the engaging grooves 11a, 11b on the side of the pad 8 are located at positions a little inside the center (the substantially central position of the lining) on which brake torque is acting. On the other hand, in this embodiment, the engaging protrusions 3a, 3b and the engaging grooves 11a, 11b are located at positions greatly outside the center described above. Other points of the structure and action are the same as those of the third embodiment described before.

Figure 10:
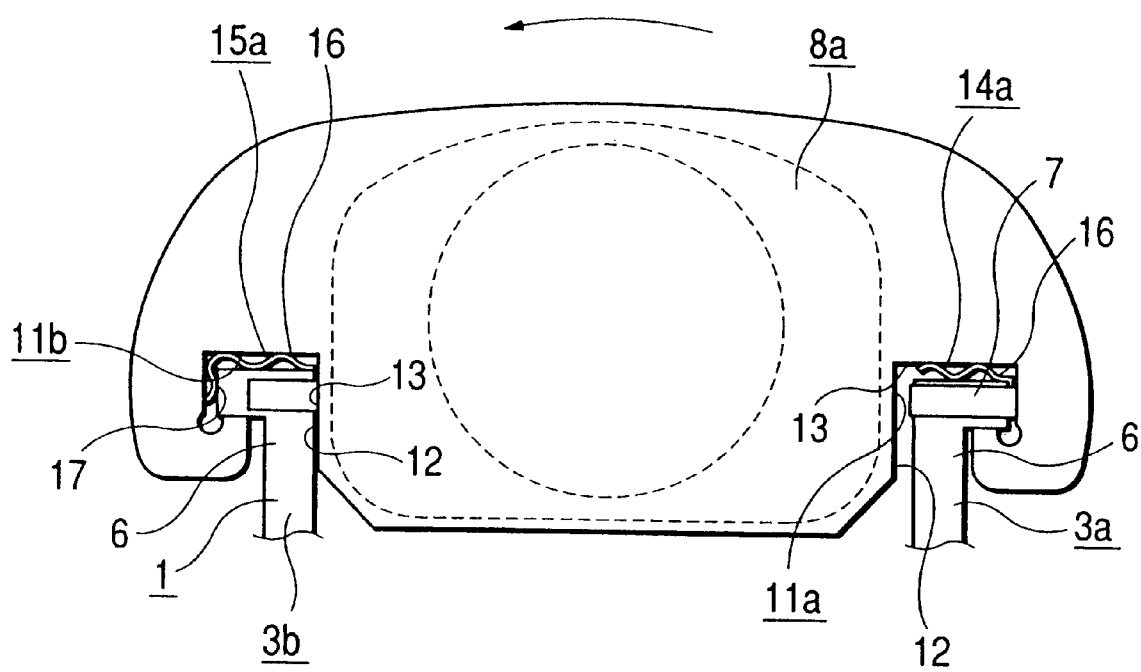
FIG. 10 is a substantial front view showing a fifth embodiment of the present invention in which an engaging section of the support member with the pad is illustrated.

FIG. 10 is a view showing the fifth embodiment of the present invention. In this embodiment, the engaging protrusions 3a, 3b on the side of support member 1 and the engaging grooves 11a, 11b on the side of the pad 8 are located at positions a little inside the center (the substantially central position of the lining) on which brake torque is acting. The first pad clip 14a arranged on the run-in side (the right in FIG. 10) is made to have a function of pushing the above pad 8a only onto the outer diameter side, and the second pad clip 15a arranged on the run-out side (the left in FIG. 10) is made to have a function of pushing the above pad 8a onto the outer diameter side and the front side (the left in FIG. 10) in the rotary direction. Other points of the structure and action are the same as those of the first embodiment described before.

The present invention is composed and activated as described above. Therefore, it is possible to realize a disc brake characterized in that: uneven wear of the lining of the pad and noise can be prevented; the performance can be stably exhibited over a long period of time; and passengers feel comfortable when they ride in the vehicle.

While only certain embodiments of the invention have been specifically described herein, it will be apparent that numerous modifications may be made thereto without departing from the spirit and scope of the invention.

What is claimed is:

1. A floating caliper type disc brake comprising:
a support member fixed to a vehicle body and arranged adjacent to a rotor rotatable with a wheel, said support member including a run-in side support engaging section arranged in an end section on a rotor run-in side thereof and a run-out side support engaging section arranged in an end section on a rotor run-out side thereof, the run-in side and run-out side support engaging sections being respectively formed into a substantially L-shaped engaging protrusion having a rising section arranged in the radial direction of the rotor and a bent section bent at a tip end of the rising section in the circumferential direction of the rotor;
a pair of pads arranged on both sides of the rotor opposing to each other, each pad including a back plate, a lining on a face on one side of the back plate opposing to the side of the rotor, a run-in side pad engaging section arranged in a run-in side end section of the back plate being slidably engaged with the rotor run-in side support engaging section, and a run-out side pad engaging section arranged in a run-out side end section of the back plate being slidably engaged with the rotor run-out side support engaging section, the run-in side and run-out side pad engaging sections being respectively formed into a substantially L-shaped engaging groove corresponding to the engaging protrusion, so that the run-in side and run-out side pad engaging sections can be freely slid in the axial direction of the rotor;
a caliper supported by said support member and freely displaced in the axial direction of the rotor; and
a piston housed in said caliper and freely pushed out toward the rotor according to supply of hydraulic fluid into said caliper,
wherein braking is conducted by pushing said pair of pads against both sides of the rotor when said piston is pushed out, and
wherein a correlation of a distance between the run-in side and run-out side support engaging sections with a distance between the run-in side and run-out side pad engaging sections is restricted so that at least one of said pad engaging sections bears a brake torque with one of the run-in side and run-out side support engaging sections when the brake torque according to a frictional force caused between the side of the rotor and the lining of said pad is not higher than a predetermined value, and both said pad engaging sections the brake torque with both the run-in side and run-out side support engaging sections when the brake torque according to the frictional force caused between the side of the rotor and the lining of said pad exceeds the predetermined value.

2. The floating caliper type disc brake according to claim 1, further comprising:
a pad clip pushing one of the run-in side and run-out side end sections of the back plate in the radial direction of the rotor, said pad clip provided between the run-in side support engaging section and the run-in side pad engaging section or between the run-out side support engaging section and the run-out side pad engaging section.

3. The floating caliper type disc brake according to claim 2, wherein said pad clip pushes one of the run-inside and run-out side end sections of the back plate in the rotary direction of the rotor in a state of running forward, said pad clip provided between at least one of the run-in side and run-out side support engaging sections and the pad engaging section engaging with the one of the support engaging sections.

4. The floating caliper type disc brake according to claim 1, further comprising:

a pad clip pushing one of the run-in side and run-out side end sections of the back plate in the rotary direction of the rotor in a state of running forward, said pad clip provided between at least one of the run-in side and run-out side support engaging sections and the pad engaging section engaging with the one of the support engaging sections.

5. The floating caliper type disc brake according to claim 2, wherein said pad clip is corrosion-resistant and interposed between the sliding faces of the run-in side support engaging section and the run-in side pad engaging section or of the run-out side support engaging section and the run-out side pad engaging section so that the sliding faces are prevented from corrosion.

6. The floating caliper type disc brake according to claim 3, wherein said pad clip is corrosion-resistant and interposed between the sliding faces of the run-in side support engaging section and the run-in side pad engaging section or of the run-out side support engaging section and the run-out side pad engaging section so that the sliding faces are prevented from corrosion.

7. The floating caliper type disc brake according to claim 4, wherein said pad clip is corrosion-resistant and interposed between the sliding faces of the run-in side support engaging section and the run-in side pad engaging section or of the run-out side support engaging section and the run-out side pad engaging section so that the sliding faces are prevented from corrosion.

* * * * *